(12) United States Patent
Chang et al.

(10) Patent No.: US 12,026,345 B2
(45) Date of Patent: *Jul. 2, 2024

(54) TOUCH PANEL FOR CAPACITIVE SENSING WITH REDUCED NOISE

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,966

(22) Filed: Apr. 25, 2023

(65) Prior Publication Data

US 2023/0259241 A1    Aug. 17, 2023

Related U.S. Application Data

(63) Continuation of application No. 17/579,661, filed on Jan. 20, 2022, now Pat. No. 11,669,214.

(60) Provisional application No. 63/139,321, filed on Jan. 20, 2021.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ... G06F 3/0446; G06F 3/0412; G06F 3/04164
See application file for complete search history.

(56) References Cited

U.S. PATENT DOCUMENTS

| | | | |
|---|---|---|---|
| 10,228,805 B2 | 3/2019 | Shepelev | |
| 10,296,124 B2 | 5/2019 | Ding et al. | |
| 11,669,214 B2 * | 6/2023 | Chang | G06F 3/0445 345/173 |
| 2014/0368624 A1 * | 12/2014 | Na | G02B 30/27 348/54 |
| 2017/0139505 A1 | 5/2017 | Shepelev | |
| 2017/0277329 A1 | 9/2017 | Ding | |
| 2017/0315657 A1 * | 11/2017 | Lai | G06F 3/04164 |
| 2017/0322662 A1 * | 11/2017 | Hsieh | G02F 1/133305 |
| 2018/0284925 A1 * | 10/2018 | Cho | G06F 3/0445 |

FOREIGN PATENT DOCUMENTS

| | | |
|---|---|---|
| CN | 106610745 A | 5/2017 |
| CN | 107436707 A | 12/2017 |
| CN | 108351725 A | 7/2018 |

* cited by examiner

*Primary Examiner* — Liliana Cerullo
(74) *Attorney, Agent, or Firm* — WPAT, P.C (57) ABSTRACT

A touch panel, sequentially comprising: a conductive layer, a dielectric layer; and at least one layer of touch electrodes, which comprises multiple first electrodes in parallel to a first axis and multiple second electrodes in parallel to a second axis, wherein the first and the second electrodes connects to a touch sensitive processing apparatus, respectively, wherein the touch sensitive processing apparatus detects an external object approaching or touching the touch panel via the first and the second electrodes, wherein the conductive layer is closer to the external object than the at least one layer of touch electrodes.

8 Claims, 6 Drawing Sheets

TOUCH PANEL FOR CAPACITIVE SENSING WITH REDUCED NOISE

CROSS REFERENCE TO RELATED PATENT APPLICATION

This patent application is a continuation application of a patent U.S. Ser. No. 11,669,214, issued on Jun. 6, 2023, with application Ser. No. 17/579,661, filed on Jan. 20, 2022, which claims domestic benefits of a U.S. provisional patent application No. 63/139,321 filed on Jan. 20, 2021.

FIELD OF THE INVENTION

The present invention relates to touch panel, and more particularly, to touch panel with conductive layer.

BACKGROUND OF THE INVENTION

Touch screen or touch panel is one of common input interfaces of modern electronic system. When a stylus, an electronic board eraser, a hand or clothes rub the touch panel or touch screen over and over, static electric charges generated would stay at the surface of the touch panel or touch screen. These static electric charges may be conducted into ground via touch electrodes. Particularly in a dry environment, these static electric charges are not easily conducted into atmosphere via moisture in the air. When the touch sensitive processing apparatus performs sensing during conduction of the static electric charges, the static electric charges would affect component of the sensing circuit so as that the position calculated according to the sensed results drifts. In the worst cases, the static electric charges may saturate capacity of sampling circuits of the sensing circuit, this results that the sensing circuit is unable to detect fingers, styli or any other objects. Hence, a problem that the present application intends to solve is to prevent or reduce impacts to capacitive touch sensing from static electric charges.

SUMMARY OF THE INVENTION

According to an embodiment of the present application, a touch panel is provided. The touch panel sequentially comprising: a conductive layer, a dielectric layer; and at least one layer of touch electrodes, which comprises multiple first electrodes in parallel to a first axis and multiple second electrodes in parallel to a second axis, wherein the first and the second electrodes connects to a touch sensitive processing apparatus, respectively, wherein the touch sensitive processing apparatus detects an external object approaching or touching the touch panel via the first and the second electrodes, wherein the conductive layer is closer to the external object than the at least one layer of touch electrodes.

According to one embodiment of the present application, a capacitance sensing method is provided. The capacitance sensing method is applicable to a touch panel, which sequentially comprises a conductive layer, a dielectric layer and at least one layer of touch electrodes comprising multiple first electrodes in parallel to a first axis and multiple second electrodes in parallel to a second axis, the capacitance sensing method comprising repeating sequentially following steps: connecting the conductive layer to a direct current potential; performing capacitance sensing an external object approaching or touching the touch panel via the first and the second electrodes, wherein the conductive layer is closer to the external object than the touch electrodes; setting the conductive layer floating; and pausing a time period without performing the capacitance sensing.

According to an embodiment of the present application, a touch sensitive processing apparatus for capacitance sensing is provided. The touch sensitive processing apparatus is applicable to a touch panel. The touch panel sequentially comprising: a conductive layer, a dielectric layer; and at least one layer of touch electrodes, which comprises multiple first electrodes in parallel to a first axis and multiple second electrodes in parallel to a second axis. The touch sensitive processing apparatus comprising: an interconnection network for connecting to the conductive layer, the first electrodes and the second electrodes, respectively; a driving circuit for connecting to the interconnection network; a sensing circuit for connecting to the interconnection network; and a processor for executing instructions stored in non-volatile memory in order to repeat following sequentially: having the interconnection network to connect the conductive layer to a direct current potential; having the driving circuit, the sensing circuit and the interconnection network to perform capacitance sensing an external object approaching or touching the touch panel via the first and the second electrodes, wherein the conductive layer is closer to the external object than the touch electrodes; having the interconnection network to set the conductive layer floating; and pausing a time period without performing the capacitance sensing.

According to an embodiment of the present application, a touch system for capacitance sensing is provided. The touch system comprising the aforementioned touch sensitive processing apparatus and touch panel.

The touch system and the touch sensitive processing apparatus for capacitance sensing and the capacitance sensing method provided by the present application are applicable to a touch panel with a highly resistant conductive layer. The conductive layer of the touch panel is functioned as to distribute static electric charges accumulated at a particular part of a surface of the touch panel to rest part of the surface. When an external object approaching or touching the particular part of the surface, errors of the capacitance sensing caused by the accumulated static electric charges can be reduced or eliminated. Accuracy of capacitance sensing can be improved accordingly.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Figure 1:
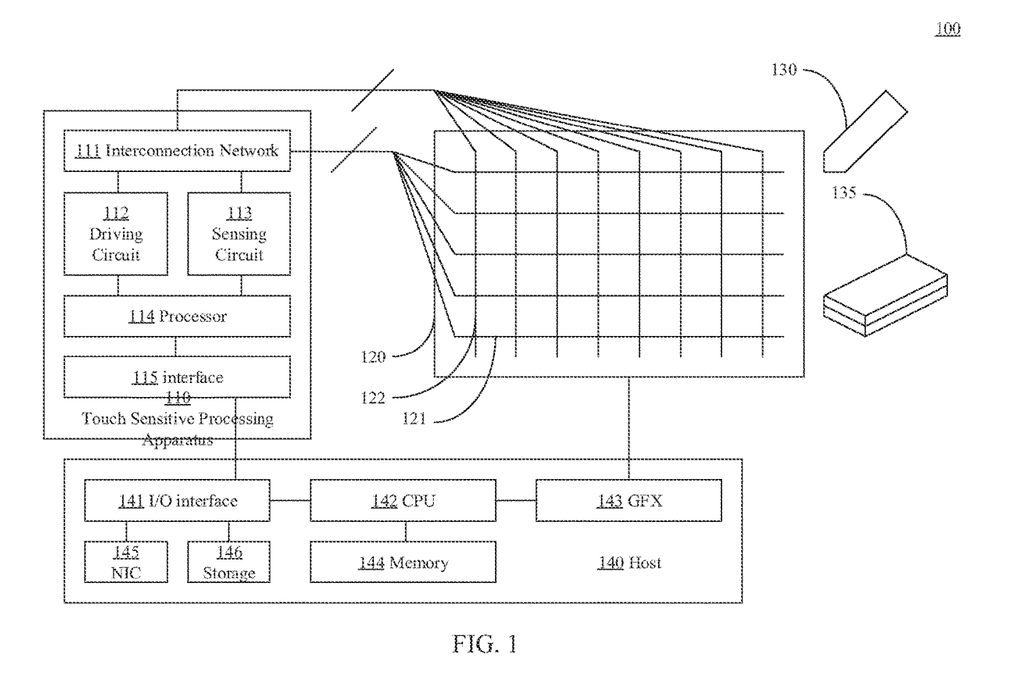
FIG. 1 shows a block diagram of a touch system 100 according to an embodiment of the present invention.

Please refer to FIG. 1, which shows a block diagram of a touch system 100 according to an embodiment of the present invention. The touch system 100 may be a computer system such as a desktop computer, a laptop computer, a tablet computer, an industrial control computer, a smartphone or any other kinds of computer having touch sensitive function.

The touch system 100 may comprise a touch sensitive processing apparatus 110, a touch panel or screen 120 coupled to the touch sensitive processing apparatus 110, and a host coupled to the touch sensitive processing apparatus 110. The touch system 100 may further comprises one or more styli 130 and/or touch board eraser 135. Hereinafter the touch panel or screen 120 is referred as the touch screen 120. However, in the embodiments lacking of display function, persons having ordinary skill in the art can understand the touch screen denoted in the present application may be referred to a touch panel.

The touch screen 120 may comprise multiple first electrodes 121 in parallel to a first axis and multiple second electrodes 122 in parallel to a second axis. The first electrodes 121 may intersect with the second electrodes 122 in order to form multiple sensing points or sensing areas. Equivalently, the second electrodes 122 may intersect with the first electrodes 121 in order to form multiple sensing points or sensing areas. In some embodiments of the present application, the first electrodes 121 may be referred as first touch electrodes 121 and the second electrodes 122 may be referred as second touch electrodes 122. The first electrodes 121 and the second electrodes 122 may be collectively referred as touch electrodes. In some embodiments with touch screens 120, the first electrodes 121 and the second electrodes 122 are made by transparent material. The first electrodes 121 and the second electrodes 122 may be disposed in one electrode layer. Conductive plates of each one of the first electrodes 121 or the second electrodes 122 may be connected by bridging. The first electrodes 121 and the second electrodes 122 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 120.

The touch sensitive processing apparatus 110 may comprise following hardware circuit: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 100 may be implemented in single integrated circuits with the host 140. The present application does not limit how to implement the touch sensitive processing apparatus 110.

The interconnection network module 111 is configured to connect each of the multiple first electrodes 121 and/or the multiple second electrodes 122 of the touch screen 120. The interconnection network module 111 may follow control command of the processor module 114 for connecting the driving circuit module 112 and any one or more touch electrodes and for connecting the sensing circuit module 113 and any one or more touch electrodes. The interconnection network module 111 may include a combination of one or more multiplexers (MUX) to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 313 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch board erasers 135. The stylus 130 and touch board eraser 135 may be transmitters which emit electrical signals. The transmitters may include active transmitter which actively emits electrical signals or passive transmitters which emit electrical signals in response to external electrical signals. The stylus 130 and touch board eraser 135 may comprise one or more electrodes which is configured to receive electrical signals from the touch screen 120 synchronously or asynchronously, or to transmit electrical signals to the touch screen 120 synchronously or asynchronously. The electrical signals may be modulated according to one or more of the aforementioned modulation methods.

The stylus 130 or touch board eraser 135 may be conductor which is configured to transmit driving signals or to be grounded via user's hand or body. The stylus 130 or touch board eraser 135 may be physically or wirelessly connected to an I/O interface 141 of the host 140 or any other interfacing circuits of the I/O interface 141.

The touch sensitive processing apparatus 110 may detect one or more external objects 139 such as fingers, palms or passive styli 130 or touch board erasers 135, or active styli 130 or touch board erasers 135 emitting electrical signals via the touch screen 120. The touch sensitive processing apparatus 110 may utilize mutual-capacitance sensing or self-capacitance sensing to detect external conductive objects. The styli 130 or touch board erasers 135 and touch sensitive processing apparatus 110 may use the aforementioned modulation and demodulation methods to transmit message via the electrical signals. The touch sensitive processing apparatus 110 may detect one or more positions where the styli 130 or touch board erasers 135 touch or approach the touch screen 120, status or sensors (pressure sensor or button) onboard the stylus 130 or touch board eraser 135, orientation angle or inclination angle of the stylus 130 or touch board eraser 135 with respect to the touch screen 120, and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage 146 module connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other circuits of the touch system 100.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
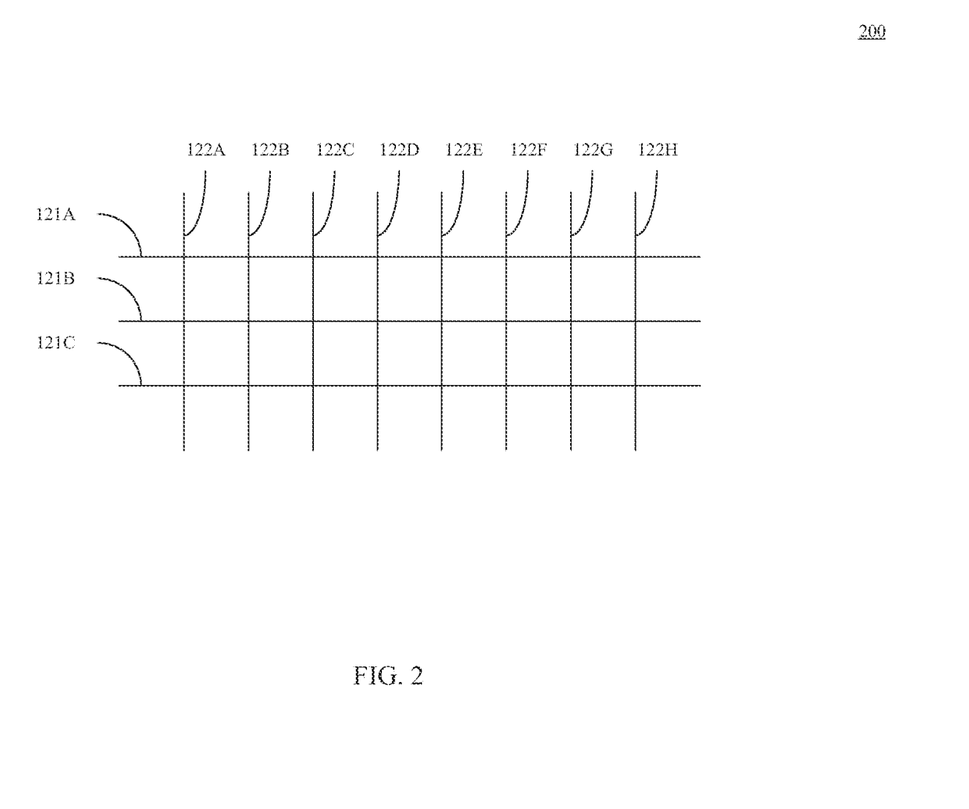
FIG. 2 illustrates a touch screen in accordance with an embodiment of the present application.

Please refer to FIG. 2, which illustrates a touch screen in accordance with an embodiment of the present application.

For convenience, the touch screen 120 includes only three first electrodes. Sequentially, they are first electrodes 121A, 121B and 121C. The touch screen 120 includes multiple second electrodes 122A~122H.

In mutual capacitance sensing, the driving circuit module 112 would provide driving signals to one of the three first electrodes 121 in a time-division manner. While the driving signals being provided, the sensing circuit module 113 is commanded to simultaneously sense all of the second electrodes 122 in three times in order to gather three one-dimensional arrays of sensing information. Each one-dimensional array includes sensing results corresponding to each of the second electrodes 122. The three one-dimensional arrays of sensing information may form a two-dimensional array of sensing information or a sensing image according to the sequence of the first electrodes 121 which transmit corresponding driving signals.

In one embodiment, what the sensing circuit module 113 outputs are sensing results with respect to each one of the second electrodes 12. In an alternative embodiment, what the sensing circuit module 113 outputs are difference values of two sensing results with respect to two adjacent second electrodes 122. Each element of the one-dimensional array is a difference value. Interferences are usually confined in a local area. Interference signals to two adjacent signals are usually similar. Hence, using a difference value of two sensing results with respect to two adjacent second electrodes 122 can eliminate most sensed value caused by interference signals.

In another embodiment, what the sensing circuit module 1113 outputs are dual difference values of sensing results with respect to three adjacent second electrodes 122. For example, a first difference value may be calculated according to sensing results of the second electrodes 122B and 122A at first, and a second difference value may be calculated according to sensing results of the second electrodes 122C and 122B. The aforementioned dual difference value is a difference between the second difference value and the first difference value. Each element of the one-dimensional array may be a dual difference value. Similarly, interferences are usually confined in a local area. Interference signals to two adjacent signals are usually similar. Hence, using a dual difference value of three sensing results with respect to three adjacent second electrodes 122 can eliminate most sensed value caused by interference signals. By utilizing the two-dimensional arrays or the sensing image including sensing information, difference values or dual difference values, the gathered sensing results may have more resistance to interferences.

Figure 3:
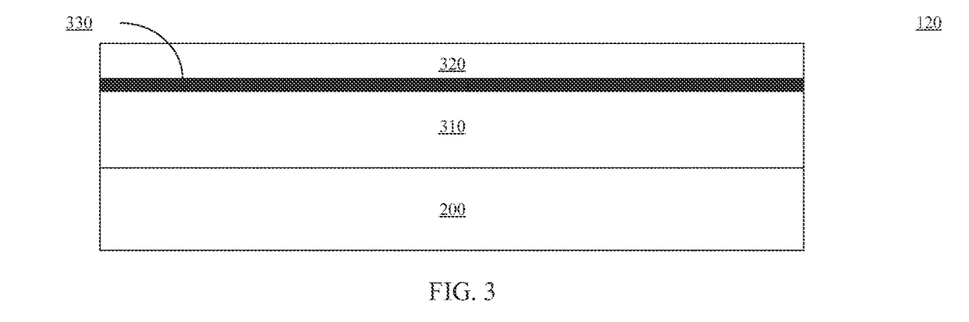
FIG. 3 depicts a profile view of a touch panel in accordance with an embodiment of the present invention.

Please refer to FIG. 3, which depicts a profile view of a touch panel in accordance with an embodiment of the present invention. What is shown in FIG. 3 is a touch panel 120. However, after placing a display underneath the touch panel 120, a touch screen is formed. Besides, although the touch panels 120 as shown in FIGS. 3~6 are planar, the present application may be applied to touch panel or touch screen 120 with curve surface as well as flexible touch panel or touch screen 120.

The bottom layer is a touch electrode layer 200. Already discussed above, the touch electrode layer 200 may include a structure having one or more layers. The first electrodes 121 and the second electrodes 122 may be disposed in the one or more layers of the touch electrode layer 200. What is on top of the touch electrode layer 200 is a glass layer or a protective layer 310 in order to protect the touch electrode layer 200 and the display underneath.

A high-resistance conductive layer 330 is disposed on top of the glass or the protective layer 310. The glass or the protective layer 310 may also insulate the touch electrode layer 200 and the conductive layer 320. On top of the conductive layer 330 is another layer of protective membrane 320. An upper surface of the protective membrane 320 is abrasion resistant. For example, the protective membrane 320 may be made of PE (Polyethylene) material. The protective membrane 320 is made of non-conductive material. The aforementioned high-resistance conductive layer 330 may be a conductive membrane made of acrylic material. The sheet resistance may be in between $10^9$ and $10^{11}$ ohms. In one embodiment, the touch electrode layer 200, the protective layer 310, the conductive layer 330 and the protective membrane 320 may be transparent. They may be flexible. However, the present application does not limit that the touch electrode layer 200, the protective layer 310, the conductive layer 330 and the protective membrane 320 should be transparent or flexible.

Potential of the high-resistance conductive layer 330 may be floated or grounded or may be connected to a direct current potential. In one embodiment, the conductive layer 330 may be connected to a tailor-made circuit of the touch sensitive processing apparatus 110 via one or more conductor lines. In one example, the conductive layer 330 may be connected to the interconnection network module 111 of the touch sensitive processing apparatus 110 via one or more conductor lines. Since the conductive layer 330 is highly resistant, power lines of capacitors between the first electrodes 121 and the second electrodes 122 are able to penetrate through the protective layer 310, the conductive layer 330 and the protective membrane 320. When a finger, a stylus 130 or a touch board eraser 135 interferes with the power lines of the capacitors, the touch sensitive processing apparatus 110 is able to detect changes of the capacitors. When the static electric charges are accumulated around a touch area on the upper surface of the touch panel 120 due to attrition of fingers, styli 130 or touch board erasers 135, the static electric charges may be distributed to other areas via the conductive layer 330 in order to decrease interference intensities at the touch area. Particularly, when the touch sensitive processing apparatus 110 uses the aforementioned difference values or dual difference values to detect touching events, it can further reduce interferences.

Figure 4:
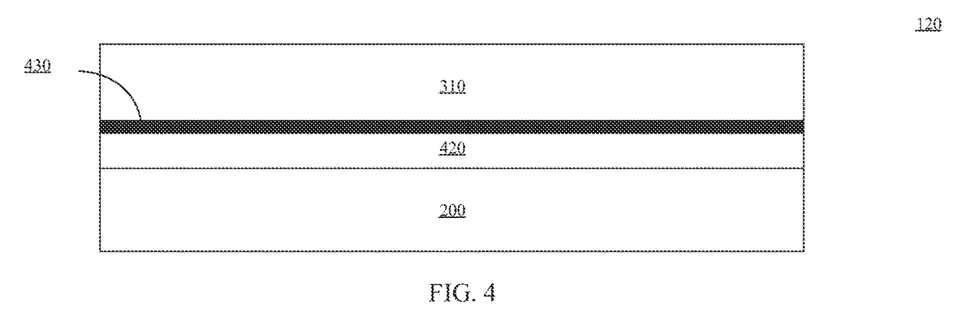
FIG. 4 depicts another profile view of a touch panel in according to another embodiment of the present invention.

Please refer to FIG. 4, which depicts another profile view of a touch panel in according to another embodiment of the present invention. Comparing with the touch panel 120 as shown in FIG. 3, a high-resistance conductive layer 430 and a protective membrane 420 are sandwiched in between a glass or protective layer 310 and a touch electrode layer 200. The protective membrane 420 may be an insulating tape. In case the touch panel 120 is transparent, the protective membrane 420 may be OCA (optical clearance adhesive) double-sided tape.

Since the glass or protective layer 310 is more resistant to abrasion than the protective membrane 320, the embodiment as shown in FIG. 4 is more resistant to abrasion than the embodiment as shown in FIG. 3. It features better protection capabilities.

Figure 5:
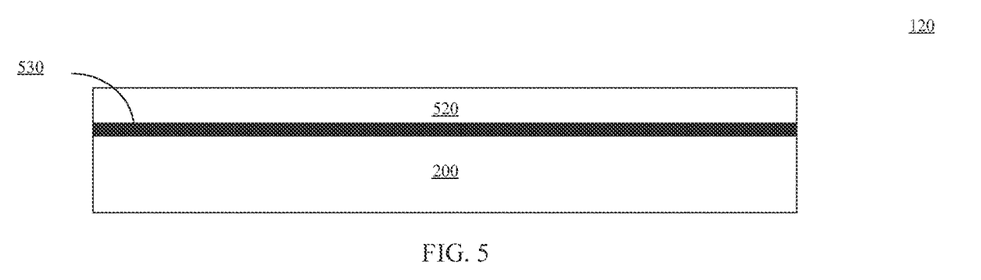
FIG. 5 depicts a profile view of a touch panel in according to an alternative embodiment of the present invention.

Please refer to FIG. 5, which depicts a profile view of a touch panel in according to an alternative embodiment of the present invention. The structure of the touch panel 120 as shown in FIG. 5 further omits the glass or protective layer 310. What on top of the touch electrode layer 200 is a high-resistance conductive layer 530 and a protective membrane 520 sequentially. Since the touch electrode layer 200 may include non-conductive base material or substrate, as long as there is non-conductive base material or substrate in between the first electrodes 121 or the second electrodes 122 and the high-resistance conductive layer 530, it can insulate the touch electrode layer 200 and the high-resistance conductive layer 530.

Figure 6:
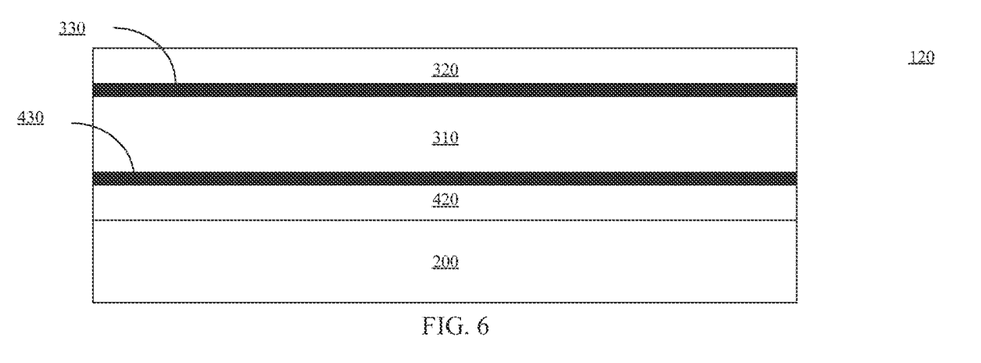
FIG. 6 depicts a profile view of a touch panel in according to an embodiment of the present invention.

Please refer to FIG. 6, which depicts a profile view of a touch panel in according to an embodiment of the present invention. The structure of the touch panel as shown in FIG. 6 includes the high-resistance conductive layers 330 and 430 and the protective membranes 320 and 420 as shown in FIGS. 3 and 4. The embodiment as shown in FIG. 6 is especially suited for a very dry region. It utilizes two high-resistance conductive layers 330 and 430 to mitigate influences from static electric charges.

In one variant of the embodiment as shown in FIG. 6, the resistant coefficients of the conductive layer 330 and the conductive layer 430 may be identical. However, in another variant, the resistant coefficients of the conductive layer 330 and the conductive layer 430 may be different. In one variant of the embodiment as shown in FIG. 6, the conductive layer 330 and the conductive layer 430 may be connected to identical ground potential or identical direct current potential. However, in another variant, the conductive layer 330 and the conductive layer 430 may be connected to different direct current potentials. Potentials of the highly resistant conductive layers 330 and 430 may be floated, grounded, or connected to a direct current potential. In one embodiment, the conductive layers 330 and 430 may be connected to the tailor-made circuit of the touch sensitive processing apparatus 110 via one or more conductor lines. In one example, the conductive layers 330 and 430 may be connected to the interconnection network module 111 of the touch sensitive processing apparatus 110, respectively.

Since the sensing circuit module 113 of the touch sensitive processing apparatus 110 includes sampling circuits, when large quantities of static electric charges pour into the sensing circuit module 113, it may not only saturate the sampling circuits but also may damage the sensing circuit module 113. Hence, the embodiments as shown in FIGS. 3~6 may protect the sensing circuit module 113 from possible damages from static electric charges.

Figure 7:
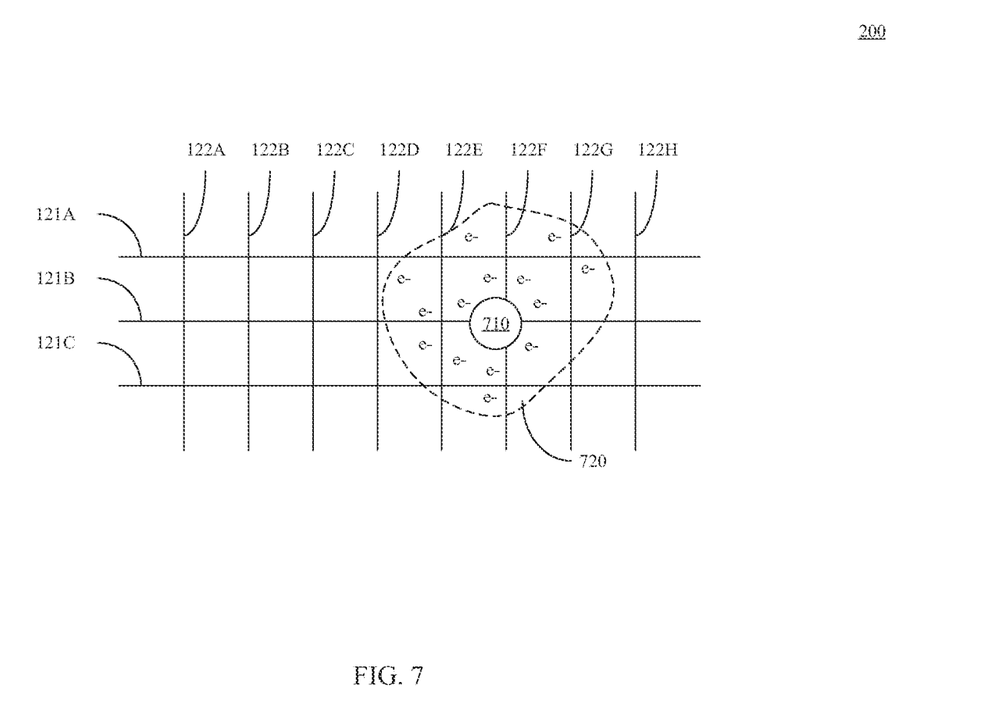
FIG. 7 depicts a detection result in accordance with an embodiment of the present application.

Please refer to FIG. 7, which depicts a detection result in accordance with an embodiment of the present application. As shown in FIG. 7, when a conductive layer with higher resistance covers the touch electrode 200, the touch sensitive processing apparatus 110 may detect a finger touching position 710 more specifically. Because an area of influenced capacitances is mostly located around an intersection of the first electrode 121B and the second electrode 122F, the area is not too large. It may be equivalent to an area of the touch panel or screen 120 which is covered by a finger. However, when a conductive layer with lower resistance covers the touch electrode 200, the area of influenced capacitances would be enlarged. The size of the area of influenced capacitances 720 may be equivalent to an area of touch panel or screen 120 which is covered by a palm. The shape of the area of influenced capacitances 720 may not be equivalent to a palm shape. Therefore selecting a conductive layer with a higher and proper resistance covering on top of the touch electrode layer 200 in order to prevent a finger touch being mistaken as a palm touch or a large object touch is also one of the features of the present application.

Figure 8:
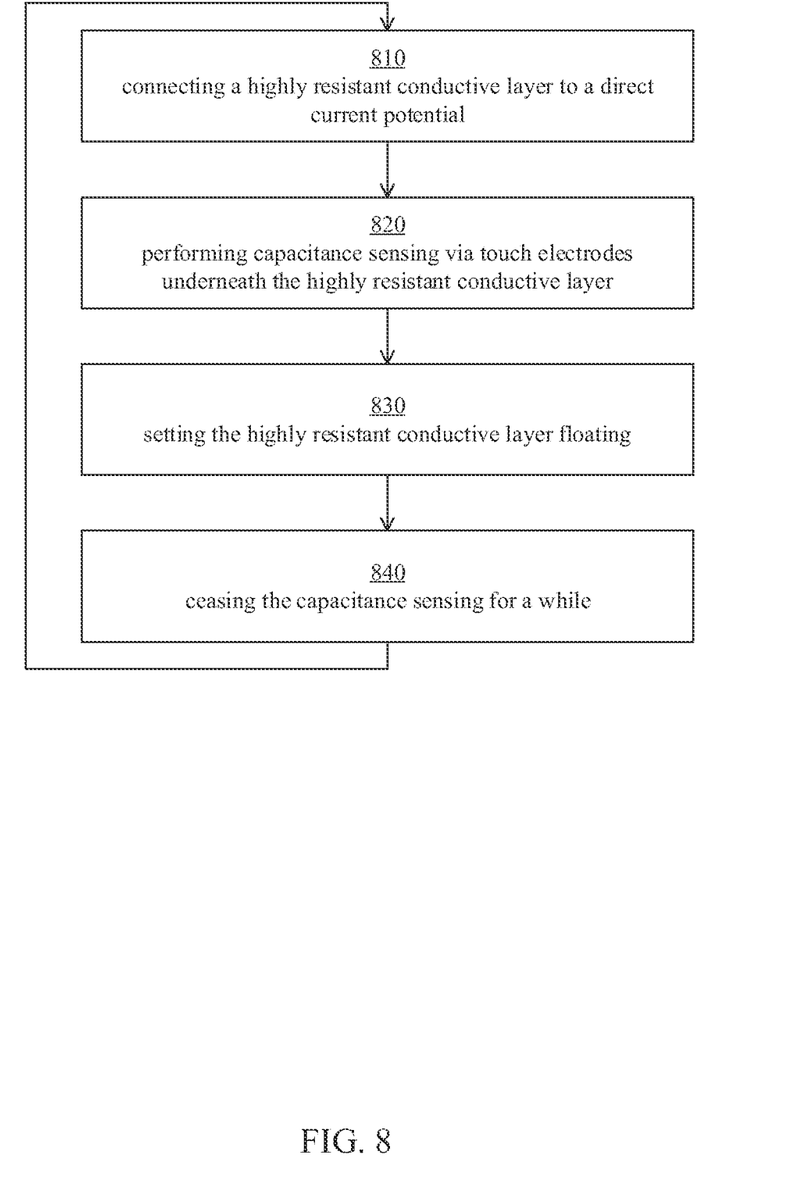
FIG. 8 depicts a flowchart diagram of a capacitance sensing method in accordance with an embodiment of the present application.

Please refer to FIG. 8, which depicts a flowchart diagram of a capacitance sensing method 800 in accordance with an embodiment of the present application. The capacitance sensing method 800 may be applied to the touch sensitive processing apparatus 110 as shown in FIG. 1. In one embodiment, the processor module 114 may execute instructions stored in non-volatile memory to realize the capacitance sensing method 800. The capacitance sensing method 800 may begin with step 810.

Step 810: connecting a highly resistant conductive layer to a direct current potential. In one embodiment, the DC potential may be a ground potential. When applied to the embodiment as shown in FIG. 6, the present step comprises connecting at least one of the highly resistant conductive layers 330 and 340 to the DC potential. In one embodiment, the touch sensitive processing apparatus 110 may comprise a circuit which is tailor made to realize the step 810 according to a command of the processor module 114. In another embodiment, the interconnection network module 111 of the touch sensitive processing apparatus 110 may connect the conductive layer to the DC potential according to a command of the processor module 114. After the step is executed, the static electric charges gathered somewhere on the surface of the touch panel or screen 120 would be directed to ground or be distributed evenly on the surface of the touch panel or screen 120.

Step 820: performing capacitance sensing via touch electrodes underneath the highly resistant conductive layer. The capacitance sensing recited in the present step may be self-capacitance sensing or mutual capacitance sensing understood by persons having ordinary skill in the art.

Step 830: setting the highly resistant conductive layer floating in order to reduce leakage current from the highly resistant conductive layer to ground via the external object (e.g. human body) for saving energy.

Step 840: ceasing the capacitance sensing. At this step, the capacitance sensing is paused for a while. Then the flow returns to step 810.

According to an embodiment of the present application, a touch panel is provided. The touch panel sequentially comprising: a conductive layer, a dielectric layer; and at least one layer of touch electrodes, which comprises multiple first electrodes in parallel to a first axis and multiple second electrodes in parallel to a second axis, wherein the first and the second electrodes connects to a touch sensitive processing apparatus, respectively, wherein the touch sensitive processing apparatus detects an external object approaching or touching the touch panel via the first and the second electrodes, wherein the conductive layer is closer to the external object than the at least one layer of touch electrodes.

Preferably, in order to adapt to an extremely dry environment, the touch panel further sequentially comprises a protective layer, a second conductive layer and a second dielectric layer, wherein the second dielectric layer is sandwiched in between the second conductive layer and the conductive layer.

Preferably, in order to provide highly resistant conductive layer, the sheet resistance of the conductive layer is in a range between $10^9$ through $10^{11}$ ohms per square. The sheet resistance of the second conductive layer is in a range between $10^9$ through $10^{11}$ ohms per square.

Preferably, in order to reduce leakage current when no capacitance sensing is performed, the conductive layer connects to the touch sensitive processing apparatus via one or more conductor line, wherein the touch sensitive processing apparatus selectively connects the conductive layer to a direct current potential or sets the conductive layer floating. The second conductive layer connects to the touch sensitive processing apparatus via one or more conductor line, wherein the touch sensitive processing apparatus selectively connects the second conductive layer to a direct current potential or sets the second conductive layer floating.

Preferably, in order to provide a touch screen with reduced static electricity influence, the touch panel further comprises a protective layer above the conductive layer, wherein the touch panel is a part of the display apparatus, the at least one layer of touch electrodes is embedded in the display apparatus in an in-cell form, wherein the dielectric layer comprises OCA (optical clearance adhesive) double-sided tape, the conductive layer and the at least one layer of touch electrodes are transparent.

Preferably, in order to provide a touch screen with reduced static electricity influence, the touch panel further comprises a display apparatus underneath the at least one layer of touch electrodes, wherein the dielectric layer comprises OCA (optical clearance adhesive) double-sided tape, the conductive layer and the at least one layer of touch electrodes are transparent.

Preferably, in order to provide flexible or curve design with reduced static electricity influence, the conductive layer, the dielectric layer and the at least one layer of touch electrodes have one of following characteristics: flexible; and curved.

According to one embodiment of the present application, a capacitance sensing method is provided. The capacitance sensing method is applicable to a touch panel, which sequentially comprises a conductive layer, a dielectric layer and at least one layer of touch electrodes comprising multiple first electrodes in parallel to a first axis and multiple second electrodes in parallel to a second axis, the capacitance sensing method comprising repeating sequentially following steps: connecting the conductive layer to a direct current potential; performing capacitance sensing an external object approaching or touching the touch panel via the first and the second electrodes, wherein the conductive layer is closer to the external object than the touch electrodes; setting the conductive layer floating; and pausing a time period without performing the capacitance sensing.

Preferably, in order to adapt to an extremely dry environment, the touch panel further sequentially comprises a protective layer, a second conductive layer and a second dielectric layer, wherein the connecting the conductive layer to a direct current potential step further comprises connecting the second conductive layer to a direct current potential and the setting the conductive layer floating step further comprises setting the second conductive layer floating.

According to an embodiment of the present application, a touch sensitive processing apparatus for capacitance sensing is provided. The touch sensitive processing apparatus is applicable to a touch panel. The touch panel sequentially comprising: a conductive layer, a dielectric layer; and at least one layer of touch electrodes, which comprises multiple first electrodes in parallel to a first axis and multiple second electrodes in parallel to a second axis. The touch sensitive processing apparatus comprising: an interconnection network for connecting to the conductive layer, the first electrodes and the second electrodes, respectively; a driving circuit for connecting to the interconnection network; a sensing circuit for connecting to the interconnection network; and a processor for executing instructions stored in non-volatile memory in order to repeat following sequentially: having the interconnection network to connect the conductive layer to a direct current potential; having the driving circuit, the sensing circuit and the interconnection network to perform capacitance sensing an external object approaching or touching the touch panel via the first and the second electrodes, wherein the conductive layer is closer to the external object than the touch electrodes; having the interconnection network to set the conductive layer floating; and pausing a time period without performing the capacitance sensing.

Preferably, in order to adapt to an extremely dry environment, the touch panel further sequentially comprises a protective layer, a second conductive layer and a second dielectric layer, wherein the processor is further configured for having the interconnection network to connect the second conductive layer to a direct current potential when connecting the conductive layer to a direct current potential; and having the interconnection network to set the second conductive layer floating when setting the conductive layer floating.

According to an embodiment of the present application, a touch system for capacitance sensing is provided. The touch system comprising the aforementioned touch sensitive processing apparatus and touch panel.

The touch system and the touch sensitive processing apparatus for capacitance sensing and the capacitance sensing method provided by the present application are applicable to a touch panel with a highly resistant conductive layer. The conductive layer of the touch panel is functioned as to distribute static electric charges accumulated at a particular part of a surface of the touch panel to rest part of the surface. When an external object approaching or touching the particular part of the surface, errors of the capacitance sensing caused by the accumulated static electric charges can be reduced or eliminated. Accuracy of capacitance sensing can be improved accordingly.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:
1. A touch panel, sequentially comprising:
   a conductive layer;
   a dielectric layer; and
   at least one layer of touch electrodes, which comprises multiple first electrodes in parallel to a first axis and multiple second electrodes in parallel to a second axis,
   wherein the first and the second electrodes connects to a touch sensitive processing apparatus, respectively,
   wherein the touch sensitive processing apparatus detects an external object approaching or touching the touch panel via the first and the second electrodes,
   wherein the conductive layer is closer to the external object than the at least one layer of touch electrodes,
   wherein the conductive layer connects to the touch sensitive processing apparatus via one or more conductor line,
   wherein the touch sensitive processing apparatus selectively connects the conductive layer to a direct current potential or sets the conductive layer floating.

2. The touch panel as claimed in claim 1, further sequentially comprises:
   a protective layer;
   a second conductive layer; and
   a second dielectric layer, wherein the second dielectric layer is sandwiched in between the second conductive layer and the conductive layer.

3. The touch panel as claimed in claim 2, wherein the sheet resistance of the second conductive layer is in a range between $10^9$ through $10^{11}$ ohms per square.

4. The touch panel as claimed in claim 2, wherein the second conductive layer connects to the touch sensitive processing apparatus via one or more conductor line, wherein the touch sensitive processing apparatus selectively connects the second conductive layer to a direct current potential or sets the second conductive layer floating.

5. The touch panel as claimed in claim 1, wherein the sheet resistance of the conductive layer is in a range between $10^9$ through $10^{11}$ ohms per square.

6. The touch panel as claimed in claim 1, further comprises a protective layer above the conductive layer, wherein the touch panel is a part of a display apparatus, the at least one layer of touch electrodes is embedded in the display apparatus in an in-cell form, wherein the dielectric layer comprises OCA (optical clearance adhesive) double-sided tape, the conductive layer and the at least one layer of touch electrodes are transparent.

7. The touch panel as claimed in claim 1, further comprises a display apparatus underneath the at least one layer of touch electrodes, wherein the dielectric layer comprises OCA (optical clearance adhesive) double-sided tape, the conductive layer and the at least one layer of touch electrodes are transparent.

8. The touch panel as claimed in claim 1, wherein the conductive layer, the dielectric layer and the at least one layer of touch electrodes have one of following characteristics: flexible; and curved.

\* \* \* \* \*